United States Patent
Pitcher et al.

(10) Patent No.: US 7,633,872 B2
(45) Date of Patent: Dec. 15, 2009

(54) METHODS, SYSTEMS, AND COMPUTER PROGRAM PRODUCTS FOR MANAGING CONGESTION IN A MULTI-LAYER TELECOMMUNICATIONS SIGNALING NETWORK PROTOCOL STACK

(75) Inventors: Michael D. Pitcher, Cary, NC (US); Mark E. Kanode, Apex, NC (US); Jeffrey A. Craig, Durham, NC (US)

(73) Assignee: Tekelec, Morrisville, NC (US)

( * ) Notice: Subject to any disclaimer, the term of this patent is extended or adjusted under 35 U.S.C. 154(b) by 418 days.

(21) Appl. No.: 11/788,033

(22) Filed: Apr. 18, 2007

(65) Prior Publication Data

US 2007/0297336 A1 Dec. 27, 2007

Related U.S. Application Data

(60) Provisional application No. 60/812,637, filed on Jun. 9, 2006.

(51) Int. Cl.
*H04L 12/26* (2006.01)
*H04L 12/56* (2006.01)

(52) U.S. Cl. .................. 370/236; 370/469
(58) Field of Classification Search ............... None
See application file for complete search history.

(56) References Cited

U.S. PATENT DOCUMENTS

| | | | |
|---|---|---|---|
| 2001/0033549 A1* | 10/2001 | Yi | 370/236 |
| 2002/0118639 A1* | 8/2002 | Chintada et al. | 370/230 |
| 2005/0003838 A1 | 1/2005 | McCann et al. | |
| 2005/0180320 A1* | 8/2005 | Yeh | 370/229 |
| 2006/0153202 A1* | 7/2006 | Dantu et al. | 370/395.52 |
| 2007/0076598 A1* | 4/2007 | Atkinson et al. | 370/229 |
| 2007/0237074 A1* | 10/2007 | Curry | 370/229 |
| 2009/0185485 A1* | 7/2009 | Swami | 370/231 |

OTHER PUBLICATIONS

George et al., "Signaling System 7 (SS7) Message Transfer Part 2 (MTP2)—User Peer-to Peer Adaptation Layer (M2PA)," RFC 4165, pp. 1-50 (Sep. 2005).
Loughney et al., "Signalling Connection Control Part User Adaptation Layer (SUA)," RFC 3868, pp. 1-123 (Oct. 2004).
Sidebottom et al., "Signalling System 7 (SS7) Message Transfer Part 3 (MTP3)—User Adaptation Layer (M3UA)," RFC 3332, pp. 1-113 (Sep. 2002).
Sprague et al., "Tekelec's Transport Adapter Layer Interface," RFC 3094, pp. 1-107 (Apr. 2001).
Stewart et al., "Stream Control Transmission Protocol," RFC 2960, pp. 1-118 (Oct. 2000).
Notification of Transmittal of the International Search Report and Written Opinion of the International Searching Authority, or the Declaration corresponding to PCT application No. PCT/US07/13444 (Jan. 18, 2008).

* cited by examiner

*Primary Examiner*—Min Jung
(74) *Attorney, Agent, or Firm*—Jenkins, Wilson, Taylor & Hunt, P.A.

(57) ABSTRACT

The subject matter described herein includes methods, systems, and computer program products for managing congestion in a multi-layer telecommunications signaling network protocol stack. According to one method, a congestion parameter is set for a first layer in a telecommunications signaling network protocol stack. The congestion parameter is automatically propagated for at least one second layer in the telecommunications signaling protocol stack. The first layer and the at least one second layer are monitored and layer-specific congestion management procedures are triggered using the parameters.

33 Claims, 6 Drawing Sheets

METHODS, SYSTEMS, AND COMPUTER PROGRAM PRODUCTS FOR MANAGING CONGESTION IN A MULTI-LAYER TELECOMMUNICATIONS SIGNALING NETWORK PROTOCOL STACK

RELATED APPLICATIONS

This application claims the benefit of U.S. Provisional Patent Application Ser. No. 60/812,637, filed Jun. 9, 2006; the disclosure of which is incorporated herein by reference in its entirety.

TECHNICAL FIELD

The subject matter described herein relates to managing congestion in a telecommunications signaling network. More particularly, the subject matter described herein relates to methods, systems, and computer program products for managing congestion in a multi-layer telecommunications signaling network protocol stack.

BACKGROUND

In telecommunications signaling networks, congestion is a condition that occurs when messages cannot reach a destination due to a processing bottleneck in the network. The processing bottleneck can be caused by an application that cannot process received messages as fast as the messages are received. Processing bottlenecks can also be caused by link level conditions.

In conventional SS7 networks, signaling messages are sent over fixed-bandwidth signaling links, and congestion monitoring and management occurs at a single layer in the SS7 protocol stack. For example, SS7 signaling messages are typically sent over TDM-based signaling links. Because the TDM-based signaling links guarantee a fixed amount of bandwidth for each signaling link, congestion can be managed using one or more fixed congestion thresholds set at a single level in the signaling message protocol stack. In conventional SS7 networks, congestion is managed at message transfer part (MTP) level 3.

In SS7 over IP (SS7/IP) signaling networks, transmission bandwidth is often shared among multiple signaling links. As a result, congestion may occur due to the fact that the underlying transmission medium is shared. In contrast, in conventional fixed-bandwidth SS7 signaling links, congestion is most likely due to a peer node not being able to process messages at a sufficiently fast rate. Accordingly, conventional SS7 congestion triggers that are designed primarily for node-related congestion may not be suitable for SS7/IP signaling links when the congestion may be due to channel over-utilization, for example. Another reason that conventional fixed-bandwidth SS7 congestion triggers may be unsuitable for SS7/IP signaling links is that congestion may first manifest itself at one or more layers below the SS7 layers in SS7/IP signaling links, and SS7 congestion management procedures are triggered only at SS7 MTP layer 3. In SS7/IP signaling links, congestion may first be detected at the transport or adaptation layer before the congestion is present at the SS7 MTP layer. Detecting congestion at a layer before it reaches the SS7 MTP layer may be useful in determining the cause of the congestion and/or detecting the congestion early.

It is possible in SS7/IP protocol stacks to manually configure congestion parameters at each layer. For example, the setsockopt( ) function can be used to set congestion parameters for a transport layer socket. However, if a congestion parameter is changed at one layer, a skilled programmer is required to set the congestion parameters at other layers in a way that is consistent with the change in the parameter at the one layer. Such skilled programming is labor intensive and prevents the easy updating of congestion management parameters as network bandwidth utilization changes.

Accordingly, in light of these difficulties associated with conventional congestion management procedures, there exists a need for improved methods, systems, and computer program products for managing congestion in a multi-layer telecommunications signaling network protocol stack.

SUMMARY

The subject matter described herein includes methods, systems, and computer program products for managing congestion in a multi-layer telecommunications signaling network protocol stack. According to one method, a congestion parameter is set for a first layer in a telecommunications signaling network protocol stack. The congestion parameter is automatically propagated for at least one second layer in the telecommunications signaling network protocol stack. The first layer and the at least one second layer are monitored and layer specific congestion management is triggered using the parameters.

The subject matter described herein for managing congestion in a multi-layer telecommunications signaling network protocol stack may be implemented using a computer program product comprising computer executable instructions embodied in a computer readable medium. Exemplary computer readable media suitable for implementing the subject matter described herein include disk memory devices, chip memory devices, programmable logic devices and application specific integrated circuits. In addition, a computer program product that implements the subject matter described herein may be located on a single device or a computing platform or may be distributed across multiple devices or computing platforms.

BRIEF DESCRIPTION OF THE DRAWINGS

Proffered embodiments of the subject matter described herein will now be explained with reference to the accompanying drawings of which.

DETAILED DESCRIPTION

Figure 1:
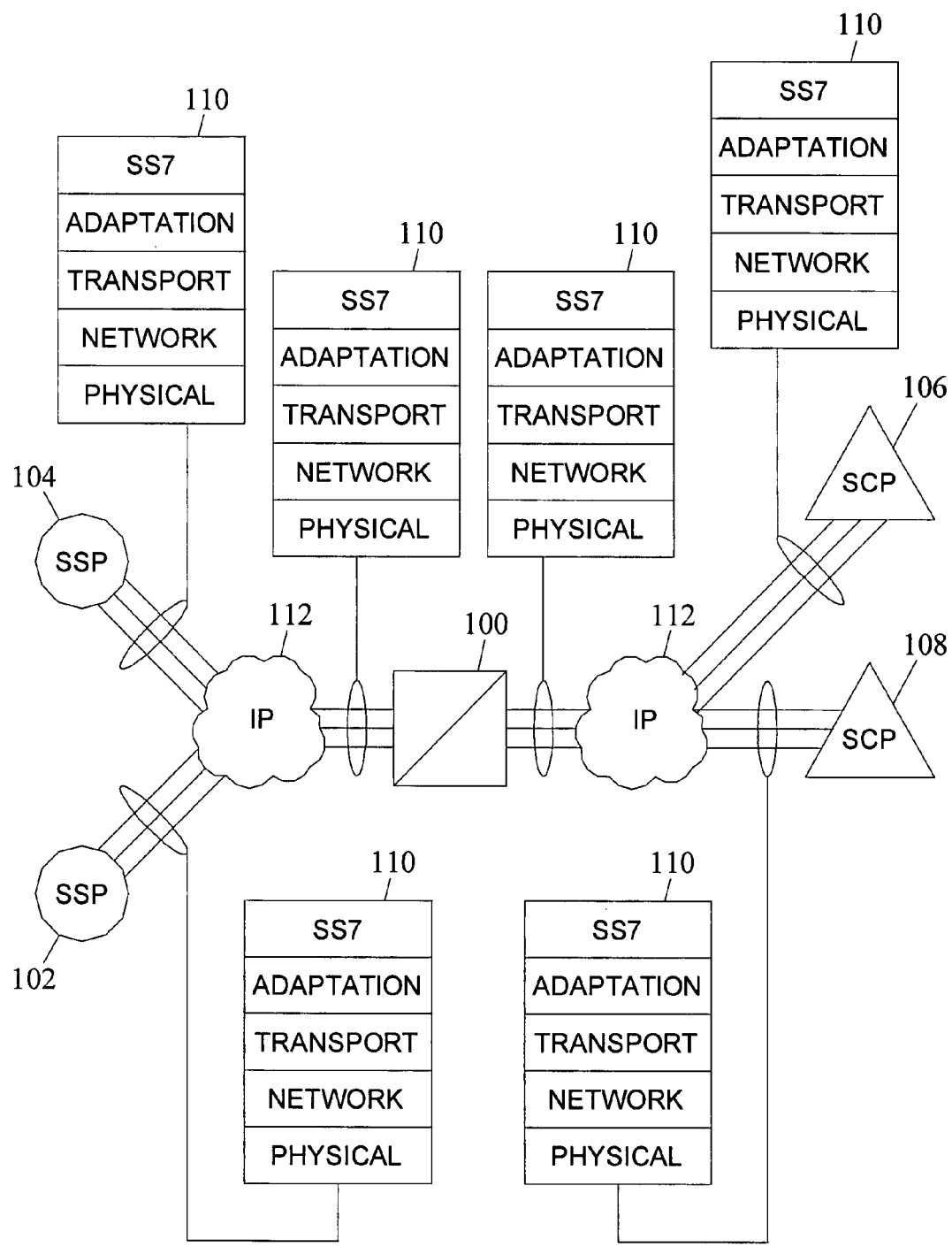
FIG. 1 is a network diagram illustrating an exemplary telecommunications signaling network in which the methods and systems described herein for managing congestion in a multi-layer telecommunications network protocol stack may be implemented.

FIG. 1 is a network diagram illustrating an exemplary telecommunications signaling network in which the subject matter described herein for managing congestion in a telecommunications signaling network protocol stack including plural layers may be implemented. Referring to FIG. 1, the network includes a plurality of nodes 100, 102, 104, 106, and 108 that are connected to each other via signaling links. In the illustrated example, node 100 is a signal transfer point (STP) with SS7 signaling message routing capabilities, SS7/IP signaling capabilities, and at least one internal message processing capability, such as global title translation (GTT) processing capability. Nodes 102 and 104 are service switching points (SSPs) for switching voice channels and for performing signaling operations necessary to establish and tear down calls. Nodes 106 and 108 are service control points (SCPs) that perform call service control functions by providing databases and responding to queries to the databases.

In the illustrated example, the signaling links that interconnect nodes 100, 102, 104, 106, and 108 implement multilayer signaling network protocol stacks 110, and each protocol stack 110 is an SS7/IP protocol stack. The nodes illustrated in FIG. 1 are interconnected via IP network 112. Even though IP network 112 is illustrated by separate clouds in FIG. 1, it is understood that IP network 112 may be a shared transmission medium where nodes 100, 102, 104, 106, and 108 share the transmission bandwidth of network 112. As a result, congestion may occur at any one or more of the layers in protocol stacks 110. It is desirable to detect congestion at the specific layer in which congestion occurs and to set congestion parameters for each of the layers in a consistent and convenient manner.

Figure 2:
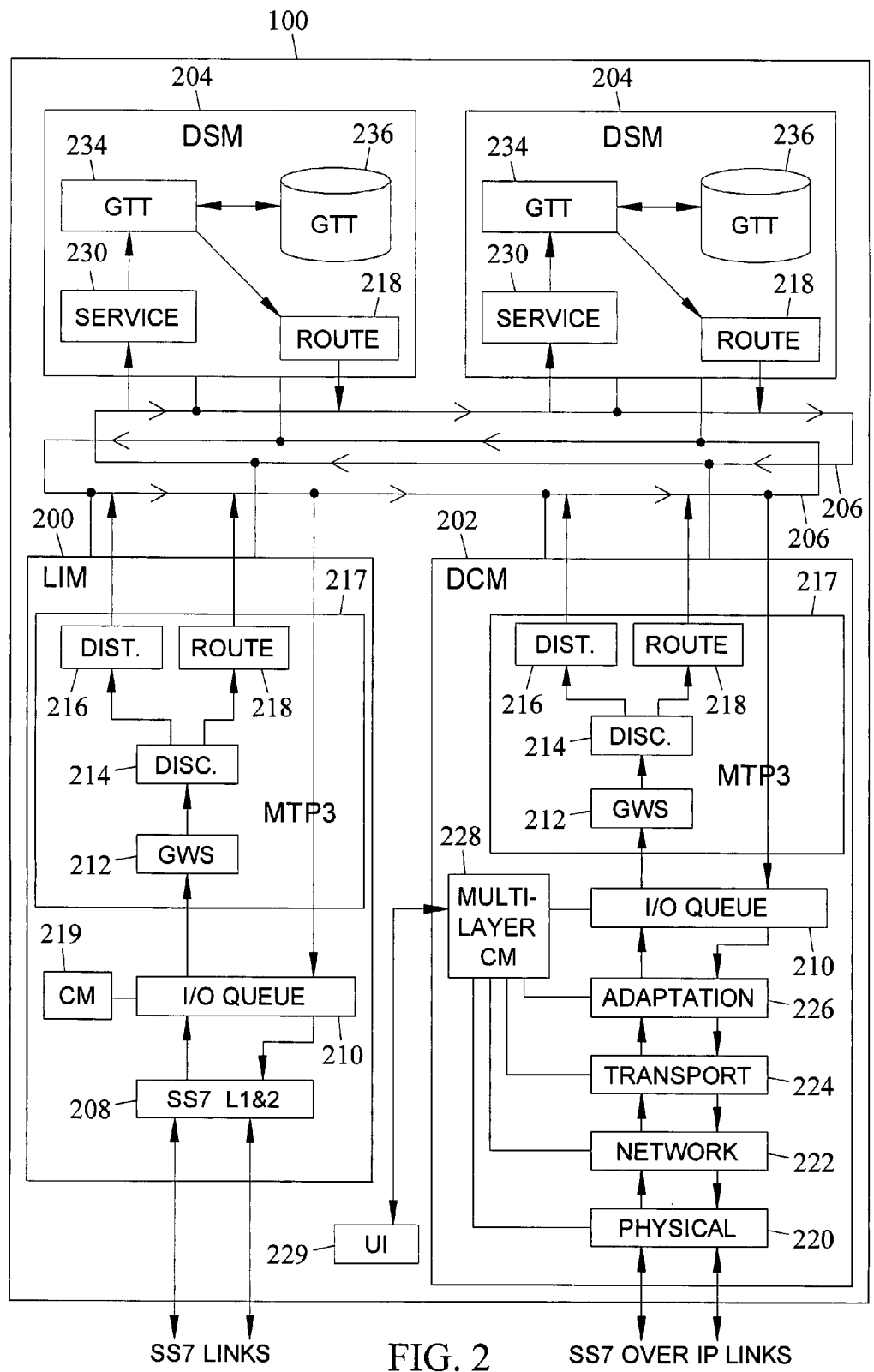
FIG. 2 is a block diagram illustrating an exemplary internal architecture of a signal transfer point with SS7/IP gateway functionality for managing congestion in a multi-layer telecommunications signaling network protocol stack according to an embodiment of the subject matter described herein.

FIG. 2 is a block diagram illustrating an exemplary internal architecture of STP 100 according to an embodiment of the subject matter described herein. Referring to FIG. 2, STP 100 includes a plurality of modules 200, 202, and 204 connected to each other via a bus 206. Each module 200, 202, and 204 may include a printed circuit board having an application processor and a communications processor mounted thereon. The application processor is the main processor of each communication module and controls its overall operation. The communication processor on its module controls communications with other modules via bus 206. Although only four modules are shown in FIG. 2, additional instances of any of the modules described herein may be included without departing from the scope of the subject matter described herein.

In illustrated example, module 200 comprises an SS7 link interface module (LIM) for interfacing with conventional TDM- or ATM-based signaling links. LIM 200 includes an SS7 layer 1 and 2 function 208, an I/O queue 210, a gateway screening function 212, a discrimination function 214, a distribution function 216, a routing function 218, and a single-layer congestion manager 219. SS7 level 1 and 2 function 208 performs SS7 level 1 and 2 operations, such as message sequencing, error correction, and error detection. I/O queue 210 queues inbound messages destined for higher processing layers and outbound messages destined to be sent over SS7 signaling links. Gateway screening function 212 screens SS7 messages based on MTP level 3 parameters to determine whether to allow the messages into the network. Discrimination function 214 determines whether messages require further processing by STP 100 or whether the messages are to be routed. Discrimination function 214 forwards messages that are to be distributed for further processing to distribution function 216. Discrimination function 214 forwards messages that require routing to routing function 218. Distribution function 216 distributes messages that require internal processing to the appropriate module within STP 100 for that processing. Routing function 218 routes messages that do not require internal processing based on one or more parameters, such as SS7 point codes, to the interface module associated with the outbound signaling link. All of the functions 212, 214, 216, and 218 are MTP level 3 components, as indicated by box 217.

Congestion manager 219 sets MTP level 3 congestion levels in response to provisioning by a user and monitors the depths of one or more MTP level 3 queues to determine whether any of the congestion conditions are met. If a congestion condition is met, congestion manager 219 may invoke SS7 congestion management procedures, such as the sending of congestion management messages to peer nodes in the network.

Module 202 comprises a data communications module (DCM) for interfacing with SS7/IP signaling links. DCM 202 includes a physical layer function 220, a network layer function 222, a transport layer function 224, an adaptation layer function 226, functions 210, 212, 214, 216, and 218 described with regard to LIM 200, and a multi-layer congestion manager 228. Physical layer function 220 performs OSI physical layer operations, such as controlling access to a shared transmission medium. In one implementation, physical layer function 220 may be implemented using Ethernet. Network layer function 222 performs OSI network layer operations, such as network layer routing and participating in routing protocols. Network layer function 222 may be implemented using Internet protocol (IP). Transport layer function 224 performs OSI transport layer operations, such as connection-oriented or connectionless delivery of messages. Transport layer function 224 may be implemented using transmission control protocol (TCP), user datagram protocol (UDP), or stream control transmission protocol (SCTP).

Adaptation layer function 226 performs functions for adapting SS7 messages for transport over an IP network. Adaptation layer 226 may be implemented using any suitable adaptation layer protocol, such as MTP level 3 user adaptation layer (M3UA), SCCP user adaptation layer (SUA), MTP level 2 user peer to peer adaptation layer (M2PA), SS7 MTP2 user adaptation layer (M2UA), Tekelec's transport adapter layer interface (TALI), or signaling ATM adaptation layer (SAAL) over TALI, as described in the correspondingly named Internet Engineering Task Force (IETF) requests for comments (RFCs) and Internet drafts or ATM standards (in the case of SAAL). Functions 210, 212, 214, 216, and 218 perform the operations described above with regard to LIM 200. Hence, a description thereof will not be repeated herein.

If adaptation layer 226 is M3UA, SUA, M2PA, or SUA, transport layer 224 may be SCTP. If adaptation layer 226 is TALI or SAAL over TALI, transport layer 224 may be TCP.

The subject matter described herein is not limited to the adaptation and transport layer protocols listed above. Any Sigtran or non-Sigtran protocol that performs the same or equivalent function of one of the protocols listed above is intended to be within the scope of the subject matter described herein.

Multi-layer congestion manager 228 is capable of receiving a congestion parameter set by user via user interface 224 for one of layers 220, 222, 224, 226, for an SS7 layer, or an abstract congestion parameter and automatically propagating the congestion parameter to other layers. Each of layers 220, 222, 224, 226, and SS7 layers may monitor its own state and determine whether a congestion threshold has been met based on the congestion parameter or parameters set for each layer. Examples of propagation of congestion parameters and multi-layer congestion management will be described in detail below. User interface 229 may be a GUI or a command line interface implemented in software on module 202 or on an OA&M module (not shown) separate from module 202 that allows a user to set congestion parameters.

Modules 204 comprise database service modules (DSMs) that perform database-related services for SS7 messages. Each DSM 204 includes a service selection module 230, a global title translation module 234, a global title translation database 236, and a routing function 218. Service selection function 230 determines which database-related service is to be applied to a signaling message that is routed to a DSM 204. In the illustrated example, the only service is global title translation (GTT). Accordingly, service selection function 230 may select GTT function 234 to process a received signaling message. GTT function 234 performs a lookup in GTT database 236 based on a called party address in the SCCP portion of a received SS7 message. GTT function 234 may determine in the lookup a point code and subsystem number corresponding to the called party address and insert the point code and subsystem number in the message. GTT function 234 may then pass the message to routing function 218, which routes the message to the appropriate LIM or DCM associated with the destination signaling link.

Figure 3:
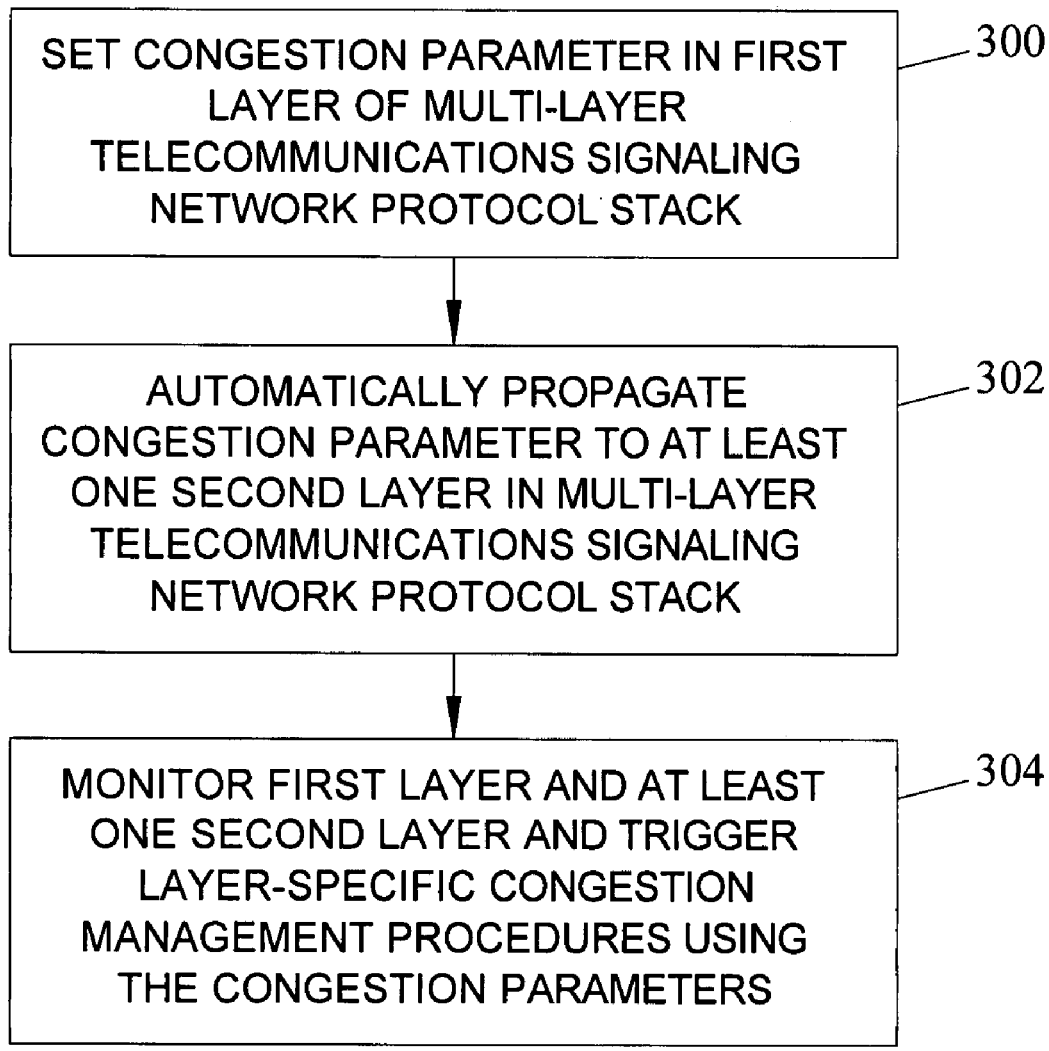
FIG. 3 is a flow chart illustrating an exemplary process for managing congestion in a multi-layer telecommunications network protocol stack according to an embodiment of the subject matter described herein.
Figure 4:
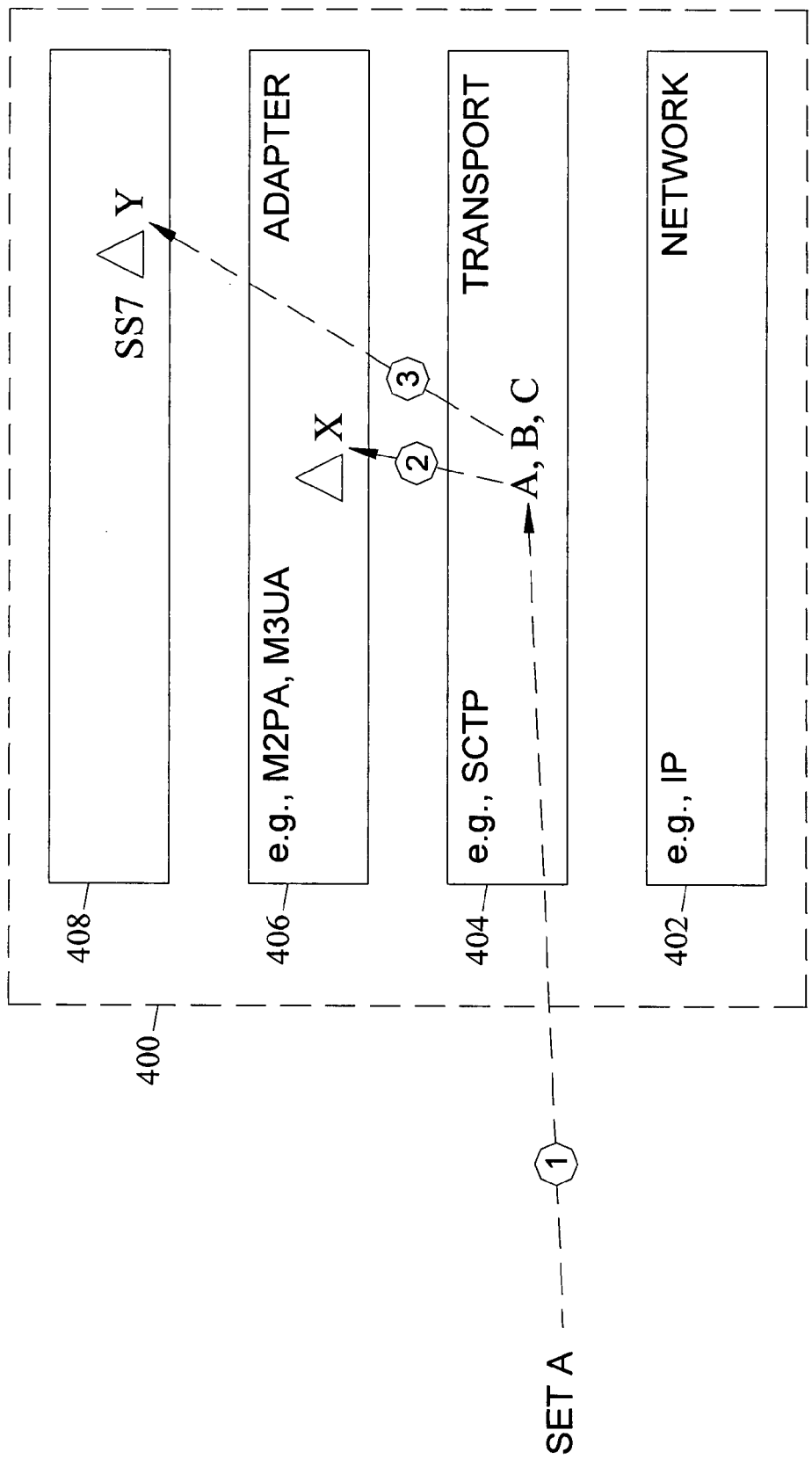
FIG. 4 is a block diagram illustrating an exemplary telecommunications signaling network protocol stack in which a congestion parameter set at one layer is automatically propagated to remaining layers in the protocol stack according to an embodiment of the subject matter described herein.

FIG. 3 is a flow chart illustrating an exemplary process for managing congestion in a multi-layer telecommunications signaling network protocol stack according to an embodiment of the subject matter described herein. Referring to FIG. 3, in step 300, a congestion parameter is set in a first layer of a multi-layer telecommunications signaling network protocol stack. Referring to FIG. 4, a telecommunications signaling network protocol stack 400 may include layers 402, 404, 406, and 408. A user may set a congestion parameter at one of the layers. In the illustrated example, the user sets a congestion parameter at transport layer 404. An example layer of a transport layer congestion parameter that may be set is a waiting to be acknowledged queue depth, which indicates a depth of a queue that contains outstanding transport layer messages to be acknowledged.

Returning to FIG. 3, in step 302, the congestion parameter is automatically propagated to at least one second layer in the multi-layer telecommunications signaling network protocol stack. Returning to FIG. 4, once the user sets the congestion parameter for transport layer 404, that congestion parameter is automatically propagated to adaptation layer 406 and SS7 layer 408. Such propagation occurs automatically, i.e., without requiring the user to manually determine or calculate congestion parameters for layers 406 and 408. Exemplary calculations that may be used will be presented below.

Returning to FIG. 3, in step 304, the first layer and the remaining layers to which the congestion parameters are propagated are monitored. In FIG. 4, layers 404, 406, and 408 may be monitored by the protocol software at each layer. The congestion parameters may be used to trigger layer-specific congestion management procedures. For example, congestion may first manifest itself at a lower layer, such as transport layer 404. If a packet loss occurs at transport layer 404, the transmit window of the sender may close as it waits for the lost packet or packets to be acknowledged. Transport layer 404 may notify adapter layer 406 that the connection or association is full. Adapter layer 406 may notify SS7 layer 408 that the link is congested. SS7 layer 408 may trigger SS7 congestion management procedures if the congestion parameter for that layer has been met or exceeded. Similarly, layers 404 and 406 may implement congestion management procedures specific to their layers, such as timeouts and retransmissions for the transport layer.

Although in the example illustrated in FIG. 4, the congestion parameter is propagated from a lower layer to an upper layer, the subject matter described herein is not limited to upward propagation of congestion parameters. In an alternate example, congestion parameters may be propagated from an upper layer, such as layer 408 to lower layers, such as layers 404 and 406.

Figure 5:
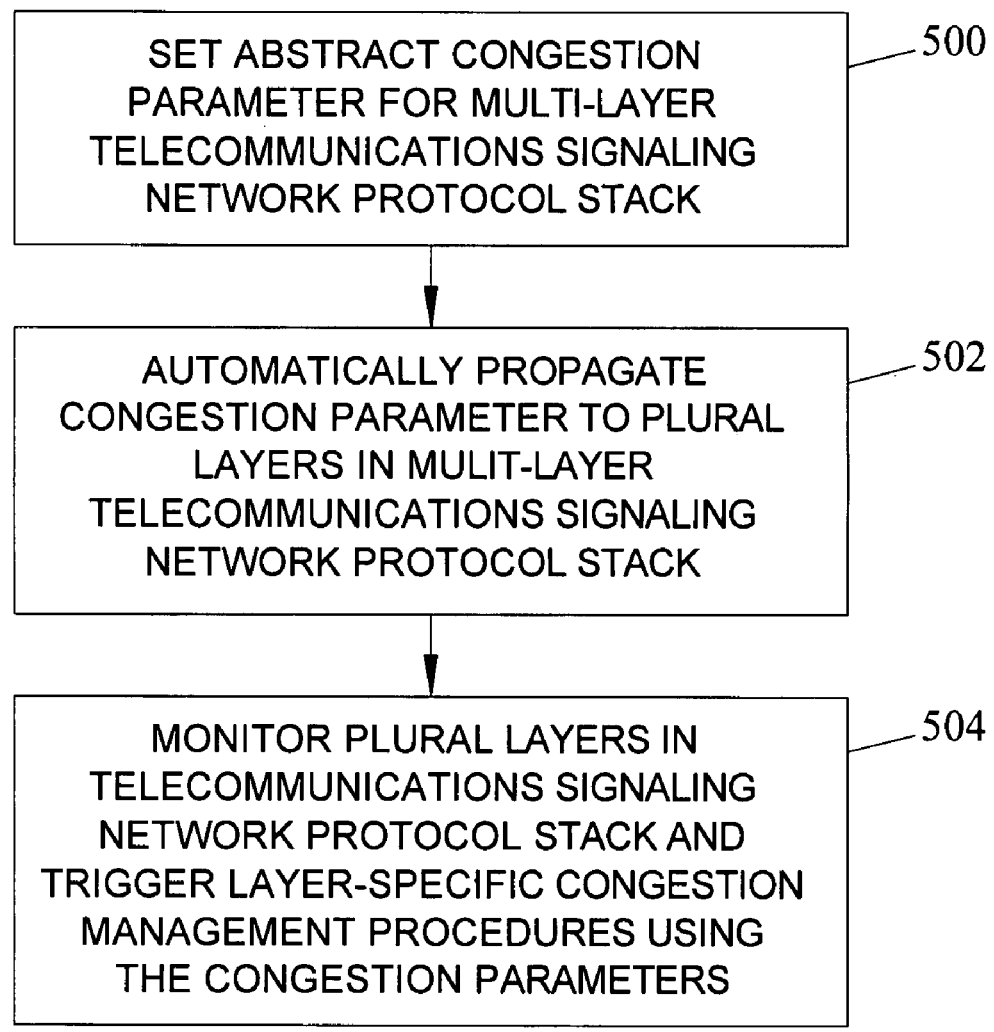
FIG. 5 is a flow chart illustrating an exemplary process for setting an abstract congestion parameter and automatically propagating the abstract congestion parameter to plural layers of a telecommunications signaling network protocol stack according to an embodiment of the subject matter described herein.
Figure 6:
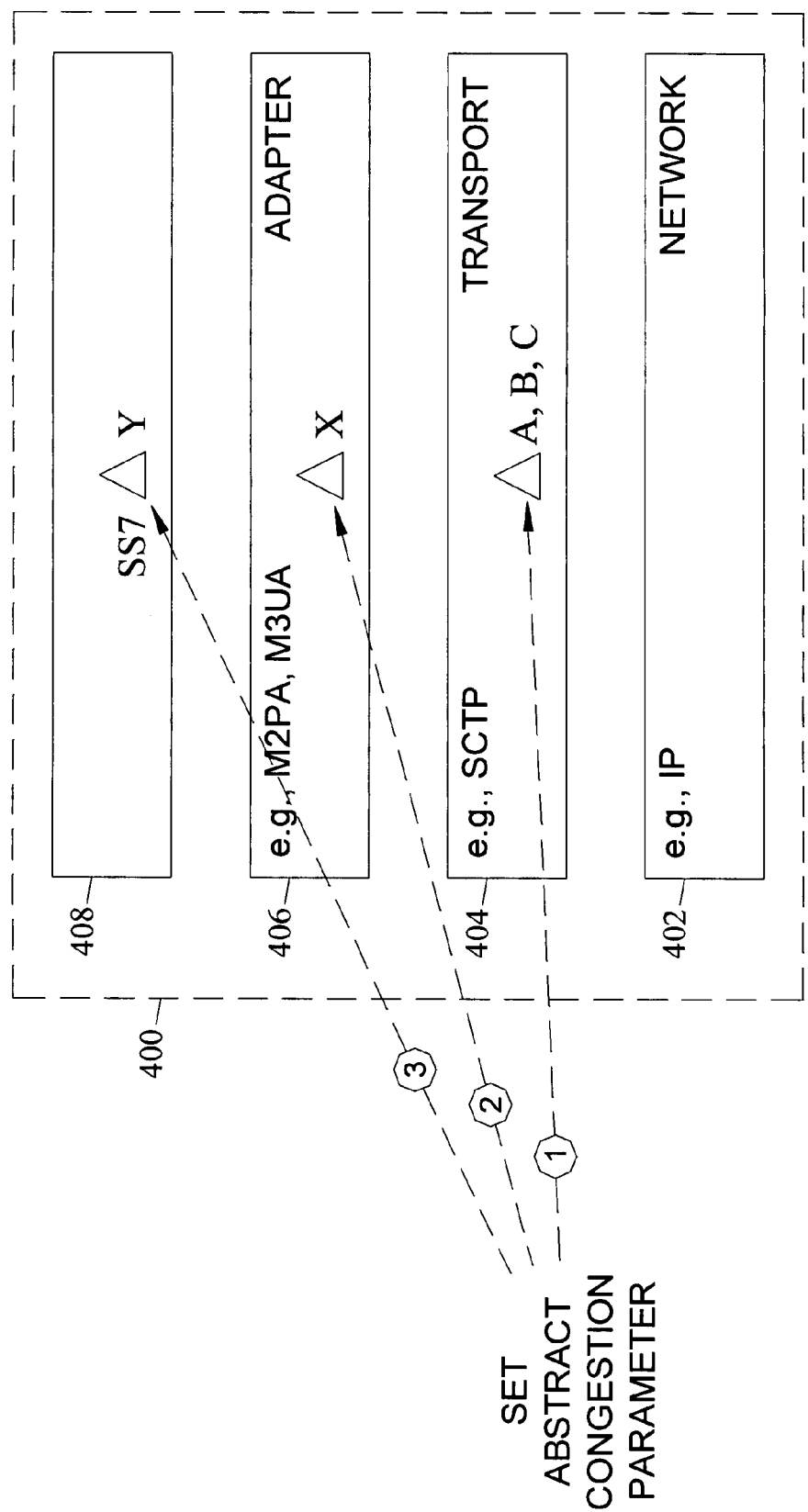
FIG. 6 is a block diagram illustrating the exemplary telecommunications signaling network protocol stack and automatically propagating an abstract congestion parameter to plural layers in the telecommunications signaling network protocol stack according to an embodiment of the subject matter described herein.

In the example illustrated in FIGS. 3 and 4, a congestion parameter is set for one layer and propagated to other layers. In an alternate implementation of the subject matter described herein, an abstract or layer-independent congestion parameter that may be set and that parameter may be automatically propagated to plural layers in a multi-layer telecommunications signaling network protocol stack. FIG. 5 is a flow chart illustrating an exemplary process for automatically propagating an abstract congestion parameter to plural layers in a multi-layer telecommunications signaling message protocol stack according to an embodiment of the subject matter described herein. Referring to FIG. 5, in step 500, an abstract congestion parameter is set for a multi-layer telecommunications signaling network protocol stack. Referring to FIG. 6, a user may set an abstract congestion parameter. The abstract congestion parameter may be a parameter that is not associated with any of layers 402, 404, 406, and 408. For example, the abstract congestion parameter may be a numeric or non-numeric value that is algorithmically related to a congestion parameter at one of layers 402, 404, 406, and 408.

Returning to FIG. 5, in block 502, the abstract congestion parameter is automatically propagated to plural layers in the multi-layer telecommunications signaling network protocol stack. Returning to FIG. 6, the abstract congestion parameter is automatically propagated to transport layer 404, adaptation layer 406, and SS7 layer 408.

Returning to FIG. 5, in step 504, the plural layers in the telecommunications signaling network protocol stack are monitoring and layer-specific congestion management is triggered using the congestion parameters. Returning to FIG. 6, each of layers 404, 406, and 408 may be monitored and congestion may be triggered when a congestion parameter at any of these layers is met or exceeded.

The subject matter described herein may be used to map congestion parameters where one SS7 signaling link exists for a single IP association or socket or where one SS7 signaling link is mapped to multiple IP associations or sockets. For example, the subject matter described herein may be used to automatically propagate congestion parameters set for multiple TCP sockets to adaptation and SS7 layers associated with the sockets. In addition, the subject matter described herein may be used to automatically propagate congestion parameters when multiple SS7 signaling links are mapped to one IP transport element. For example, plural signaling links may reside on a single SCTP association and the subject matter described herein may be used to automatically set congestion parameters for each of the signaling links or for all of the signaling links.

The subject matter described herein may be used to set congestion levels where the congestion management requires two levels or more than two levels. For example, the subject matter described herein may be used to set congestion parameters or congested or not congested for an ITU MTP3 implementation. For an ANSI MTP3 implementation that has four congestion levels, i.e., not congested, congested 1, congested 2, and congested 3.

Congestion Parameters

The following congestion parameters are exemplary parameters that may be manually set or automatically set based on parameters propagated from other layers. The congestion parameters whose names begin with "transport" represent transport layer parameters. The congestion parameters whose names begin with "adapter" represent SS7 adaptation or adapter layer parameters. The parameters whose names begin with "slk" represent SS7 layer parameters. As will be illustrated below, a user may set an adapter layer congestion parameter, and that parameter may be automatically propagated to SS7 and transport layers.

Exemplary Congestion Parameters transport_capacity
  Capacity of the reliable transport session (bytes/sec preferred).
transport_rto0
  Reliable transport initial time allowed for acknowledgement before retransmission.
transport_rto_mult
  Reliable transport timeout waiting for acknowledgement multiplier for each successive transmission attempt. If the parameter is less than or equal to 1, then the wait time remains fixed for each transmission. If the parameter is greater than 1, then the wait time increases for each successive transmission.
transport_max_rto
  Reliable transport maximum time allowed for acknowledgement before retransmission. This parameter establishes an upper limit for the wait time and is only applicable if transport_rto_mult is greater than 1.
transport_retx_per_path
  Reliable transport maximum number of retransmits per network path before path failure. If the transport session has only one path, then this parameter also establishes the number of retransmission allowed before the session is failed.
transport_num_paths
  Reliable transport number of unique network paths per session.
transport_snd_buf
  Reliable transport maximum size of the send buffer (maximum depth of the to-be-transmitted and waiting-for-acknowledgement queues).
adapter_max_rto
  Reliable adapter timeout waiting for acknowledgement.
adapter_max_ack_wait_q
  SS7/IP adapter maximum depth allowed for waiting-for-acknowledgement queue.
adapter_margin
  SS7/IP adapter margin factor used for parameter derivation in some embodiments. This is used to account for the extra latency caused by the adapter/transport interface at each peer.
signaling link congestion levels
  (bytes preferred, or number of messages)
slk_doc_onset
  Threshold above which the SLK is either in danger of congesting or is congested.
slk_abate1
  Threshold at/below which the SLK is not congested.
slk_onset1
  Threshold above which the SLK is experiencing the first level of congestion.
slk_discard1
  Threshold above which the first level of MSU discard is implemented. Embodiments involving ANSI MTP3 will discard MSUs having priority 0 when the signaling link reaches this level. Embodiments involving an MTP3 variant that lacks MSU priority will discard all MSUs when the signaling link reaches this level.
slk_abate2
  Threshold at/below which the SLK is not experiencing the second level of congestion.
slk_onset2
  Threshold above which the SLK is experiencing the second level of congestion.
slk_discard2
  Threshold above which the second level of MSU discard is implemented. Embodiments involving ANSI MTP3 will discard MSUs having priority 1 when the signaling link reaches this level.
slk_abate3
  Threshold at/below which the SLK is not experiencing the third level of congestion.
slk_onset3
  Threshold above which the SLK is experiencing the second level of congestion.
slk_discard3
  Threshold above which the third level of MSU discard is implemented. Embodiments involving ANSI MTP3 will discard MSUs having priority 2 when the signaling link reaches this level.
slk_max
  Threshold above which all new messages for transmission are discarded.
slk_msu_size
  Signaling link MSU size (used by message-quantity embodiments to translate between message and byte congestion quantities).

Signaling Link Congestion Threshold Relationships

The following expressions represent relationships between the congestion parameters introduced above.
  slk_max>=slk_discard3>=slk_discard2>=slk_discard1>slk_doc_onset
  slk_discard3>=slk_onset3
  slk_discard2>=slk_onset2
  slk_discard1>=slk_onset1
  slk_onset3>=slk_onset2>=slk_onset1>slk_doc_onset
  slk_onset3>slk_abate3
  slk_onset2>slk_abate2
  slk_onset1>slk_abate1

Exemplary Propagation of Congestion Parameters

The following examples illustrate the propagation of transport layer congestion parameters to adapter and SS7 layers. In these examples, it is assumed that four SS7 congestion levels (0-3) exist and that a reliable transport protocol is used. The following are the transport parameters that may be set by the user:

transport_capacity::configured by the user, bytes/sec
    transport_rto0::configured by the user, sec//what is the worst-case RTT for the network?
    transport_retx_per_path::configured by the user, quantity//how many successive retransmissions are allowed for each path?
    transport_num_paths::configured by the user, quantity//how many networks does the transport session use?
    transport_rto_mult::=1//'linear' retransmit mode, not exponential backoff
    (transport_max_rtt (sec))=transport_rto0*transport_retx_per_path*transport_num_paths
    transport_snd_buf::=transport_capacity*transport_max_rtt After defining the transport level parameters, the user may set the following adapter layer margin parameter:

adapter_margin::=1.1//account for extra latency caused by adapter/transport interface//needs to be >=1

Once the user sets the transport and the adapter layer margin parameters, the following calculations may be used to automatically propagate the parameters set for the transport layer to the adapter and SS7 layers. The following calculations illustrate this propagation:

adapter_max_rto::=transport_max_rtt*adapter_margin
    (adapter_max_ack_wait_q (bytes))=adapter_max_rto*transport_capacity
    //Note: The contents of this queue is a superset of the// contents of the transport transmission queue set.
    slk_doc_onset::=slk_capacity*adapter_max_rto
    slk_abate1::=slk_doc_onset+1
    slk_onset1::=slk_doc_onset*2
    slk_abate2::=slk_onset1+1
    slk_discard1::=slk_doc_onset*2.5
    slk_onset2::=slk_discard1+1
    slk_abate3::=slk_onset2+1
    slk_discard2::=slk_doc_onset*3
    slk_onset3::=slk_discard2+1
    slk_discard3::=slk_doc_onset*3.5
    slk_max::=slk_doc_onset*4
    slk_avg_msu_size::not used by embodiment, since unit of measure is bytes
    transport_max_rto::not used by embodiment, since transport_rto_mult==1

In the first line above, the adapter layer timeout waiting for acknowledgement parameter is calculated based on the transport layer maximum round trip time. Thus, this line illustrates the propagation of a transport layer parameter to an adapter layer.

SS7 Congestion Management Thresholds

Transmit congestion in a SS7 link can be due to either not enough transmission grants or due to an IP network or IP peer not capable of sustaining the load presented by the link at transmitting end. In the first case, the messages start backing up at a transmit queue associated with the link. The depth of this queue is monitored by a SS7 MTP layer 3 protocol software. If the total depth exceeds a certain threshold established, then L3 begins to discard the new SS7 MSU traffic and generate alarms. If the peer IP is unable to sustain the traffic load, the messages start backing up beginning with association send buffer, connection manager queue, tx_tb_q and then l3_l2_queue and L3, can detect the load and begin to shed load.

Prior Solution

Prior implementation of IP-based link interface modules by the assignee of the subject matter described herein uses the fixed congestion management threshold values defined in cong.h as follows. Note that for each priority (0-3) of SS7 messages, there are different level of congestion threshold values.

```
/*EDCM and SSEDCM*/
#define CONG_IP7_DOC_ONSET_EDCM (400)/*danger of congestion*/
#define CONG_IP7_ABATEMENT_1_EDCM (401)
#define CONG_IP7_ONSET_1_EDCM (1000)
#define CONG_IP7_DISCARD_1_EDCM (1400)
#define CONG_IP7_ABATEMENT_2_EDCM (1001)
#define CONG_IP7_ONSET_2_EDCM (1500)
#define CONG_IP7_DISCARD_2_EDCM (1800)
#define CONG_IP7_ABATEMENT_3_EDCM (1501)
#define CONG_IP7_ONSET_3_EDCM (1900)
#define CONG_IP7_DISCARD_3_EDCM (2000)
#define CONG_IP7_MAX_BFR_CNT_EDCM (2200)
```

In the prior implementation, the #define statements set fixed SS7 congestion values.

According to one aspect of the subject matter described herein, parameters set for one layer may be automatically propagated from parameters set for other layers. For example, changing of any of these values requires manual edits to the #define statements and knowledge of the interrelationships between parameters. The maximum SS7 traffic rate (MSUs/sec) supported by a link for a given association buffer size may be automatically derived from the SCTP association buffer size. The following formula determines the max SS7 traffic rate supported on a link.

$$SLK\ IP\ TPS = \frac{(\text{Association Buffer Size})/(\text{Max } MSU \text{ size in bytes})}{\text{Max } RTT \text{ (Round Trip Time)}}$$

The above formula can be used to derive the danger of congestion onset value for the link as follows.

$$\begin{aligned}\text{Danger of Congestion Onset Value} &= (SLK\ IP\ TPS) * (\text{Max } RTT) \\ &= (\text{Association Buffer Size})/(\text{Max } MSU \text{ size in bytes})\end{aligned}$$

The following table shows set of formulas used to derive various levels of congestion management thresholds.

| Congestion Parameter | Parameter Units | Derivation |
| --- | --- | --- |
| Danger of Congestion Onset | buffers | (Association Buffer Size in KB)/(Max MSU Packet Size in Bytes) |
| Abatement Level 1 | buffers | (Danger of Congestion Onset) + 1 |

-continued

| Congestion Parameter | Parameter Units | Derivation |
|---|---|---|
| Onset Level 1 | buffers | (Danger of Congestion Onset) * 2 |
| Abatement Level 2 | buffers | (Onset Level 1) + 1 |
| Discard Level 1 | buffers | (Danger, of Congestion Onset) * 2.5 |
| Onset Level 2 | buffers | (Discard Level 1) + 1 |
| Abatement Level 3 | buffers | (Onset Level 2) + 1 |
| Discard Level 2 | buffers | (Danger of Congestion Onset) * 3 |
| Onset Level 3 | buffers | (Discard Level 2) + 1 |
| Discard Level 3 | buffers | (Danger of Congestion Onset) * 3.5 |
| Maximum Allowed | buffers | (Danger of Congestion Onset) * 4 |

Rexmit Queue Depth Level

This value determines the maximum depth of the buffer storing the MSUs which have been transmitted and waiting for acknowledgment from it peers.

In one conventional implementation of an IP link interface module, the threshold value of REXMIT queue size is defined in computer source code file as follows and derived using the card capacity and max RTT values for the link.

```
#if !defined(_HC_BLADE_BSP_)
#define IPLIM_M2PA_RETX_Q_CONGESTION_DEPTH (390)
#else
#define IPLIM_M2PA_RETX_Q_CONGESTION_DEPTH (780)
#endif
```

One implementation of the present subject matter uses following formula to derive the threshold value for retransmit queue size for an M2PA link.

*IPLIM_M2PA_RETX_Q*_CONGESTION_DEPTH=*SLK DOC* ONSET=(*SLK TPS*)*(*SLK RTT*)

Examples of Congestion Threshold Calculations are as Follows:
1. SLK_TPS=association_buffer_size/max_msu_size/maxRTT
2. DOC_onset=SLK_TPS*maxRTT
3. The relationship between congestion threshold values is as follows:
   Maximum_buffer_count>=Discard_3>=Discard_2>=Discard_1>DOC_onset
   Discard_3>=Onset_3
   Discard_2>=Onset_2
   Discard_1>=Onset_1
   Onset_3>=Onset_2>=Onset_1>DOC_onset
   Onset_3>Abatement_3
   Onset_2>Abatement_2
   Onset_1>Abatement_1
4. For ANSI signaling links, there are four congestion level categories—not congested, congested1, congested2, and congested3. Each congestion level category, except the not congested category, contains an abatement, an onset, and a discard value. The congestion threshold values relate to the DOC_onset value in the following way:
   (a) Abatement_1=DOC_onset+1
   (b) Onset_1=DOC_onset*2
   (c) Discard_1=DOC_onset*5/2
   (d) Abatement_2=Onset_1+1
   (e) Onset_2=Discard_1+1
   (f) Discard_2=DOC_onset*3
   (g) Abatement_3=Onset_2+1
   (h) Onset_3=Discard_2+1
   (i) Discard_3=DOC_onset*7/2
   (j) Maximum_buffer_count=DOC_onset*4
5. For ITU links, there are two congestion level categories—not congested, and congested. Each congestion level category, except the not congested category, contains an abatement, an onset, and a discard value. The congestion threshold values relate to the DOC_onset value in the following way:
   (k) Abatement=DOC_onset*5/2
   (l) Onset=DOC_onset*3
   (m) Discard=DOC_onset*7/2
   (n) Maximum_buffer_count=DOC_onset*4

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for managing congestion in a multi-layer telecommunications signaling network protocol stack, the method comprising:
   (a) setting a congestion parameter in a first layer of a telecommunications signaling network protocol stack;
   (b) automatically propagating by a multilayer congestion manager the congestion parameter to at least one second layer in the telecommunications signaling network protocol stack;
   (c) monitoring the first layer and the at least one second layer and triggering layer-specific congestion management procedures using the congestion parameters.

2. The method of claim 1 wherein the first layer is lower than the at least one second layer in the telecommunications signaling network protocol stack.

3. The method of claim 2 wherein the first layer comprises a transport layer in the at least one second layer comprises an adaptation layer and an SS7 layer.

4. The method of claim 3 wherein the adaptation layer comprises MTP level 3 user adaptation layer (M3UA) and wherein the transport layer comprises stream control transmission protocol (SCTP).

5. The method of claim 3 wherein the adaptation layer comprises signaling connection control part user adaptation layer (SUA) and the transport layer comprises a stream control transmission protocol (SCTP) layer.

6. The method of claim 3 wherein the adaptation layer comprises MTP level 2 user peer to peer adaptation layer (M2PA) and wherein the transport layer comprises stream control transmission protocol (SCTP).

7. The method of claim 3 wherein the adaptation layer comprises SS7 MTP2 user adaptation layer (M2UA) and wherein the transport layer comprises a stream control transmission protocol (SCTP) layer.

8. The method of claim 3 wherein the adaptation layer comprises Tekelec's transport adapter layer interface (TALI) and wherein the transport layer comprises a transmission control protocol (TCP) layer.

9. The method of claim 3 wherein the adaptation layer comprises signaling ATM adaptation layer (SAAL) over Tekelec's transport adapter layer interface (TALI) and wherein the transport layer comprises a transmission control protocol (TCP) layer.

10. The method of claim 3 wherein the adaptation layer parameter comprises an adaptation layer queue depth and wherein the transport layer parameter comprises a waiting for acknowledgment queue depth.

11. The method of claim 1 wherein automatically populating the congestion parameter includes populating a congestion parameter set for a single IP association to a single SS7 signaling link associated with the IP association.

12. The method of claim 1 wherein automatically populating the congestion parameter includes populating a congestion parameter set for a single IP association to a plurality of SS7 signaling links associated with the IP association.

13. The method of claim 3 wherein a many to one relationship exists between the transport layer and the adaptation layer.

14. The method of claim 1 wherein the first layer is higher than the at least one second layer.

15. The method of claim 1 wherein automatically propagating the congestion parameter to at least one second layer includes calculating a value of a congestion parameter for the at least one second layer based on the congestion parameter value set for the first layer.

16. A method for managing congestion in an multi-layer telecommunications signaling network protocol stack, the method comprising:
(a) setting an abstract congestion parameter for a telecommunications signaling network protocol stack;
(b) automatically propagating by a multilayer congestion manager the abstract congestion parameter to a plurality of layers in the telecommunications signaling network protocol stack; and
(c) monitoring each of the layers and triggering layer-specific congestion management procedures using the parameter values.

17. A system for managing congestion in a multi-layer telecommunications signaling network protocol stack, the system comprising:
(a) a user interface for allowing a user to define a congestion parameter for a first layer in a multi-layer telecommunications signaling network protocol stack; and
(b) a multi-layer congestion manager for automatically propagating the congestion parameter to at least one second layer in the telecommunications signaling network protocol stack, wherein the first layer and the at least one second layer trigger layer-specific congestion management procedures using the congestion parameters set for each layer.

18. The system of claim 17 wherein the first layer is lower than the at least one second layer in the telecommunications signaling network protocol stack.

19. The system of claim 17 wherein the first layer comprises a transport layer and the at least one second layer comprises an adaptation layer and an SS7 layer.

20. The system of claim 19 wherein the adaptation layer comprises an MTP3 user adaptation layer (M3UA) and wherein the transport layer comprises a stream control transmission protocol (SCTP) layer.

21. The system of claim 19 wherein the adaptation layer comprises a signaling connection control part user adaptation layer (SUA) and wherein the transport layer comprises a stream control transmission control protocol (SCTP) layer.

22. The system of claim 19 wherein the adaptation layer comprises an MTP level 2 user peer to peer adaptation (M2PA) layer and wherein the transport layer comprises a stream control transmission protocol (SCTP) layer.

23. The system of claim 19 wherein the adaptation layer comprises an SS7 MTP2 user adaptation layer (M2UA) layer and wherein the transport layer comprises a stream control transmission protocol (SCTP) layer.

24. The system of claim 19 wherein the adaptation layer comprises Tekelec's transport adapter layer interface (TALI) and wherein the transport layer comprises a transmission control protocol (TCP) layer.

25. The method of claim 19 wherein the adaptation layer comprises signaling ATM adaptation layer (SAAL) over Tekelec's transport adapter layer interface (TALI) and wherein the transport layer comprises a transmission control protocol (TCP) layer.

26. The system of claim 19 wherein the congestion parameter comprises a transport layer waiting for acknowledgment queue depth and wherein the propagated congestion parameter includes an adaptation layer queue depth.

27. The system of claim 17 wherein automatically populating the congestion parameter includes populating a congestion parameter set for a single IP association to a single SS7 signaling link associated with the IP association.

28. The system of claim 17 wherein automatically populating the congestion parameter includes populating a congestion parameter set for a single IP association to a plurality of SS7 signaling links associated with the IP association.

29. The system of claim 19 wherein a many to one relationship exists between the transport layer and the adaptation layer.

30. The system of claim 17 wherein the first layer is higher than the at least one second layer.

31. The system of claim 17 wherein the multi-layer congestion manager is adapted to automatically calculate congestion values for the at least one second layer based on the congestion parameter set for the first layer.

32. A computer program product comprising computer executable instructions embodied in a computer readable medium, said computer executable instructions for performing steps comprising:
(a) setting a congestion parameter in a first layer of a telecommunications signaling network protocol stack;
(b) automatically propagating the congestion parameter to at least one second layer in the telecommunications signaling network protocol stack;
(c) monitoring the first layer and the at least one second layer and triggering layer-specific congestion management procedures using the congestion parameters.

33. A computer program product comprising computer executable instructions embodied in a computer readable medium, said computer executable instructions for performing steps comprising:
(a) setting an abstract congestion parameter for a telecommunications signaling network protocol stack;
(b) automatically propagating the abstract congestion parameter to a plurality of layers in the telecommunications signaling network protocol stack; and
(c) monitoring each of the layers and triggering layer-specific congestion management procedures using the parameter values.

* * * * *